US012535864B2

(12) United States Patent
Zeng (10) Patent No.: US 12,535,864 B2
(45) Date of Patent: Jan. 27, 2026

(54) ELECTRONIC DEVICE

(71) Applicant: VIVO MOBILE COMMUNICATION CO., LTD., Dongguan (CN)

(72) Inventor: Pengjun Zeng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 109 days.

(21) Appl. No.: 18/757,946

(22) Filed: Jun. 28, 2024

(65) Prior Publication Data

US 2024/0385660 A1 Nov. 21, 2024

Related U.S. Application Data

(63) Continuation of application No. PCT/CN2022/142592, filed on Dec. 28, 2022.

(30) Foreign Application Priority Data

Dec. 29, 2021 (CN) .......................... 202111645303.5

(51) Int. Cl.
*G06F 1/16* (2006.01)

(52) U.S. Cl.
CPC .......... *G06F 1/1681* (2013.01); *G06F 1/1616* (2013.01); *G06F 1/1647* (2013.01); *G06F 1/1652* (2013.01); *G06F 1/1656* (2013.01)

(58) Field of Classification Search
CPC ........ G06F 1/16; G06F 1/1616; G06F 1/1641; G06F 1/1647; G06F 1/1652; G06F 1/1656; G06F 1/1681
See application file for complete search history.

(56) References Cited

U.S. PATENT DOCUMENTS

| 2021/0286408 | A1 | 9/2021 | Chueh et al. |
| 2022/0390986 | A1* | 12/2022 | Pan ...................... G06F 1/1656 |
| 2024/0420603 | A1* | 12/2024 | Feng ..................... G06F 1/1681 |

FOREIGN PATENT DOCUMENTS

| CN | 107690010 A | 2/2018 |
| CN | 110266836 A | 9/2019 |

(Continued)

OTHER PUBLICATIONS

International Search Report and Written Opinion issued in corresponding International Application No. PCT/CN2022/142592, mailed Mar. 10, 2023, 9 pages.

(Continued)

*Primary Examiner* — Robin J Mishler
(74) *Attorney, Agent, or Firm* — IPX PLLC (57) ABSTRACT

An electronic device includes a first device body, a second device body, a flexible display screen, a shaft assembly, a first transmission member, and a first mounting bracket. The first mounting bracket is rotatably connected to the shaft assembly, the first device body is slidably matched with the first mounting bracket, and the second device body is connected to the shaft assembly. The flexible display screen includes a first display screen disposed on the first device body, a second display screen disposed on the second device body, and a third display screen that connects the first display screen to the second display screen. The first transmission member is rotatably matched with the first mounting bracket, and the first transmission member is connected to the shaft assembly and the first device body.

11 Claims, 7 Drawing Sheets

(56) References Cited

FOREIGN PATENT DOCUMENTS

| | | |
|---|---|---|
| CN | 110784567 A | 2/2020 |
| CN | 111049954 A | 4/2020 |
| CN | 212718904 U | 3/2021 |
| CN | 112901645 A | 6/2021 |
| CN | 113012569 A | 6/2021 |
| CN | 114338875 A | 4/2022 |
| WO | 2018082338 A1 | 5/2018 |
| WO | 2021082554 A1 | 5/2021 |

OTHER PUBLICATIONS

Extended European Search Report issued in related European Application No. 22914848.1, mailed Mar. 3, 2025, 23 pages.
First Office Action issued in related Chinese Application No. 202111645303.5, mailed Jul. 2, 2024, 7 pages.

* cited by examiner

ELECTRONIC DEVICE

CROSS-REFERENCE TO RELATED APPLICATIONS

This application is a continuation of International Application No. PCT/CN2022/142592, filed on Dec. 28, 2022, which claims priority to Chinese Patent Application No. 202111645303.5, filed on Dec. 29, 2021. The entire contents of each of the above-referenced applications are expressly incorporated herein by reference.

TECHNICAL FIELD

This application pertains to the field of communication device technologies, and specifically relates to an electronic device.

BACKGROUND

With the development of technologies, the development of electronic devices is increasingly rapid, and users' requirements on the electronic devices are increasingly high. At present, flexible screens are widely used in electronic devices, to form foldable electronic devices.

A foldable electronic device often has some problems in a folding process. For example, when a foldable electronic device is folded inward, because a bending radius at a hinge is small, a flexible screen is prone to creases or damage due to excessive squeezing. When the foldable electronic device is folded outward, because a bending radius at the hinge is large, the flexible screen is prone to deformation and even cracking due to excessive stretching. It can be learned that, a problem that a flexible screen is prone to damage exists in a process of folding an existing foldable electronic device, resulting in a short service life of the flexible screen.

SUMMARY

An objective of embodiments of this application is to provide an electronic device.

This application is implemented as follows.

An electronic device includes a first device body, a second device body, a flexible display screen, a shaft assembly, a first transmission member, and a first mounting bracket.

The first mounting bracket is rotatably connected to the shaft assembly, the first device body is slidably matched with the first mounting bracket, and the second device body is connected to the shaft assembly.

The flexible display screen includes a first display screen, a second display screen, and a third display screen. The first display screen is disposed on the first device body, the second display screen is disposed on the second device body, and the first display screen is connected to the second display screen through the third display screen.

The first transmission member is rotatably matched with the first mounting bracket, and the first transmission member is connected to the shaft assembly and the first device body.

In a process of folding the electronic device, the shaft assembly drives the first transmission member to rotate relative to the first mounting bracket, and drives, through the first transmission member, the first device body to move close to the shaft assembly.

In a process of unfolding the electronic device, the shaft assembly drives the first transmission member to rotate relative to the first mounting bracket, and drives, through the first transmission member, the first device body to move away from the shaft assembly.

DETAILED DESCRIPTION

The following clearly describes technical solutions in embodiments of this application with reference to accompanying drawings in embodiments of this application. Apparently, the described embodiments are some but not all of embodiments of this application. All other embodiments obtained by a person of ordinary skill in the art based on embodiments of this application shall fall within the protection scope of this application.

The terms "first", "second", and the like in this specification and claims of this application are used to distinguish between similar objects instead of describing a specific order or sequence. It should be understood that terms used in such a way are interchangeable in proper circumstances, so that embodiments of this application can be implemented in an order other than the order illustrated or described herein. Objects classified by "first", "second", and the like are usually of a same type, and a quantity of objects is not limited. For example, there may be one or more first objects. In addition, in this specification and the claims, "and/or" indicates at least one of connected objects, and a character "/" generally indicates an "or" relationship between associated objects.

With reference to FIG. 1 to FIG. 8, an electronic device provided in embodiments of this application is described in detail by using embodiments and application scenarios thereof.

Refer to FIG. 1 to FIG. 4. The electronic device according to the present disclosure includes a first device body 100, a second device body 200, a flexible display screen 300, a shaft assembly 400, a first transmission member 500, and a first mounting bracket 600. The first device body 100 and the second device body 200 are basic structure members, and can provide a mounting base for the flexible display screen 300, the shaft assembly 400, or another component in the electronic device. For example, another component in the electronic device may be a battery, a circuit board, or the like. It should be noted that, a component in the electronic device is related to a type or use of the electronic device. Therefore, a type and a quantity of specific components in the electronic device are not limited in embodiments of this application.

Refer to FIG. 1 to FIG. 4. The first mounting bracket 600 is rotatably connected to the shaft assembly 400. The first device body 100 is slidably matched with the first mounting bracket 600, and the second device body 200 is connected to the shaft assembly 400. Further, the flexible display screen 300 includes a first display screen 310, a second display screen 320, and a third display screen 330. The first display screen 310 is disposed on the first device body 100, the second display screen 320 is disposed on the second device body 200, and the first display screen 310 is connected to the second display screen 320 through the third display screen 330.

In the foregoing embodiment, the first device body 100 may rotate relative to the shaft assembly 400 with the first mounting bracket 600. The second device body 200 is connected to the shaft assembly 400, that is, the first device body 100 may rotate relative to the second device body 200, so as to implement folding or unfolding of the electronic device.

In one of the embodiments, an angle between the first device body 100 and the second device body 200 ranges from a second angle to a first angle. In a case that the angle between the first device body 100 and the second device body 200 is the first angle, display surfaces of the flexible display screen 300 are located on a same plane, that is, the electronic device is in an unfolded state. In a case that the angle between the first device body 100 and the second device body 200 is the second angle, the first device body 100 and the second device body 200 are folded against each other, that is, the electronic device is in a folded state. For example, the first device body 100 and the second device body 200 may rotate between 0° and 180°.

In an embodiment, the flexible display screen 300 of the electronic device is an outward-folding display. In a case that the electronic device is folded, the display surface of the flexible display screen 300 is located on the outside. For example, in a case that the angle between the first device body 100 and the second device body 200 is the second angle, a side of the first device body 100 away from the flexible display screen 300 is superposed on a side of the second device body 200 away from the flexible display screen 300. In other words, in a case that the electronic device is in the folded state, the first display screen 310 is located on a side of the first device body 100 away from the second device body 200, and the second display screen 320 is located on a side of the second device body 200 away from the first device body 100. It should be noted that, the display surface of the flexible display screen 300 is a surface of the flexible display screen 300 on which an image or text can be displayed.

Further, the first device body 100 is slidably matched with the first mounting bracket 600, and the first display screen 310 is disposed on the first device body 100, so that the first display screen 310 can move, with the first device body 100, in a direction toward or away from the shaft assembly 400.

Refer to FIG. 2 to FIG. 8. The first transmission member 500 is rotatably matched with the first mounting bracket 600, and the first transmission member 500 is connected to the shaft assembly 400 and the first device body 100. In a process of folding the electronic device, the shaft assembly 400 drives the first transmission member 500 to rotate relative to the first mounting bracket 600, and drives, through the first transmission member 500, the first device body 100 to move close to the shaft assembly 400. In a process of unfolding the electronic device, the shaft assembly 400 drives the first transmission member 500 to rotate relative to the first mounting bracket 600, and drives, through the first transmission member 500, the first device body 100 to move away from the shaft assembly 400.

It should be noted that, that the first device body 100 moves in a direction toward the shaft assembly 400 means that the first device body 100 moves close to the shaft assembly 400 in a direction in which the first device body 100 faces toward the shaft assembly 400. That the first device body 100 moves in a direction away from the shaft assembly 400 means that the first device body 100 moves away from the shaft assembly 400 in a direction in which the first device body 100 faces away from the shaft assembly 400.

In the foregoing embodiment, the flexible display screen 300 is divided into three parts: the first display screen 310, the second display screen 320, and the third display screen 330. The first display screen 310 is disposed on the first device body 100, and the second display screen 320 is disposed on the second device body 200. A first end of the third display screen 330 is connected to the first display screen 310, a second end of the third display screen 330 is connected to the second display screen 320, and at least a part of the third display screen 330 is opposite to the shaft assembly 400.

In a process of folding the electronic device, the first display screen 310 moves in a direction toward the shaft assembly 400, to drive the first end of the third display screen 330 to move close to the second end of the third display screen 330. In this way, the third display screen 330 can form redundancy, to accommodate deformation at the shaft assembly 400 in the process of folding the electronic device, and eliminate or reduce squeezing force on a part of the flexible display screen 300 opposite to the shaft assembly 400, so as to protect the flexible display screen 300.

In a process of unfolding the electronic device, the first display screen 310 moves in a direction away from the shaft assembly 400, to drive the first end of the third display screen 330 to move away from the second end of the third display screen 330. In this way, the redundancy formed by the third display screen 330 is stretched, to accommodate deformation at the shaft assembly 400 in the process of unfolding the electronic device, and eliminate or reduce tensile force on the part of the flexible display screen 300 opposite to the shaft assembly 400, so as to protect the flexible display screen 300.

In an embodiment, in a process of folding the electronic device, action may be performed on the first end of the third display screen 330 and the second end of the third display screen 330, so that the third display screen 330 forms redundancy. In an embodiment, action is performed to enable the first end of the third display screen 330 to move in a direction toward the second end of the third display screen 330, so that the first end of the third display screen 330 and the second end of the third display screen 330 are close to each other to form redundancy. In another embodiment, action is performed to enable the second end of the third display screen 330 to move in a direction toward the first end of the third display screen 330, so that the first end of the third display screen 330 and the second end of the third display screen 330 are close to each other to form redundancy. Action may be performed on the two ends of the third display screen 330, so that the first end of the third display screen 330 and the second end of the third display screen 330 are close to each other to form redundancy.

Similarly, in a process of unfolding the electronic device, action may be performed to enable the first end and/or the second end of the third display screen 330 to move, so that the first end of the third display screen 330 and the second end of the third display screen 330 are away from each other to eliminate redundancy formed by the third display screen 330.

In an embodiment, both the first device body 100 and the second device body 200 may move away from or close to the shaft assembly 400. Further, there are at least two first transmission members 500, including at least one first transmission member 500 connected to the first device body 100 and the shaft assembly 400, and at least one first transmission member 500 connected to the second device body 200 and the shaft assembly 400. In a process of folding the electronic device, the shaft assembly 400 drives, through the first transmission member 500, the first device body 100 and/or the second device body 200 to move close to the shaft assembly 400. In a process of unfolding the electronic device, the shaft assembly 400 drives, through the first transmission member 500, the first device body 100 and/or the second device body 200 to move away from the shaft assembly 400.

There are many connection manners in which the shaft assembly 400 drives the first transmission member 500, for example, thread fitting, gear-rack transmission connection, and cam mechanism connection. Therefore, a specific manner of connecting the shaft assembly 400 to the first transmission member 500 is not limited in embodiments of this application.

Figure 1:
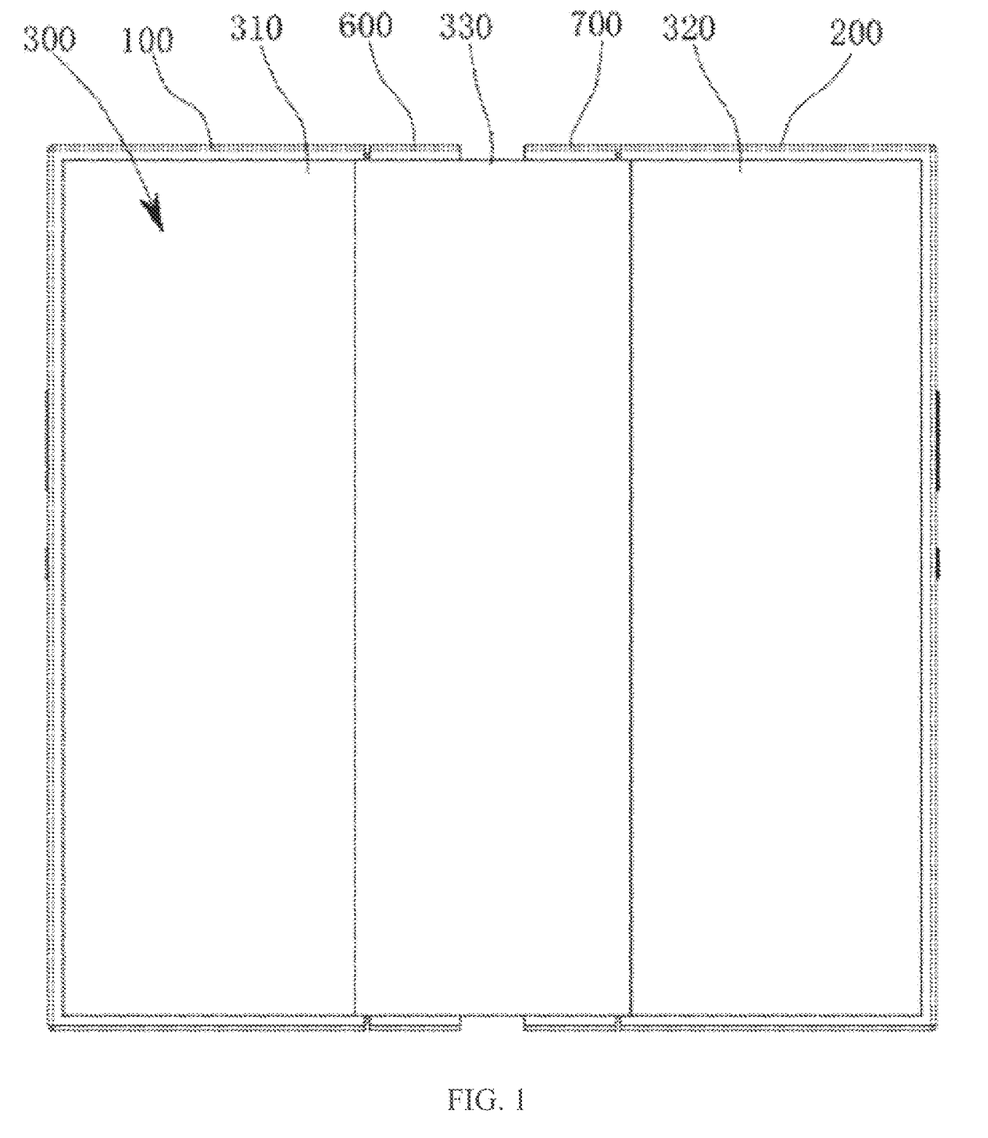
FIG. 1 is a diagram of an electronic device from a first perspective according to an embodiment of the present disclosure.
Figure 2:
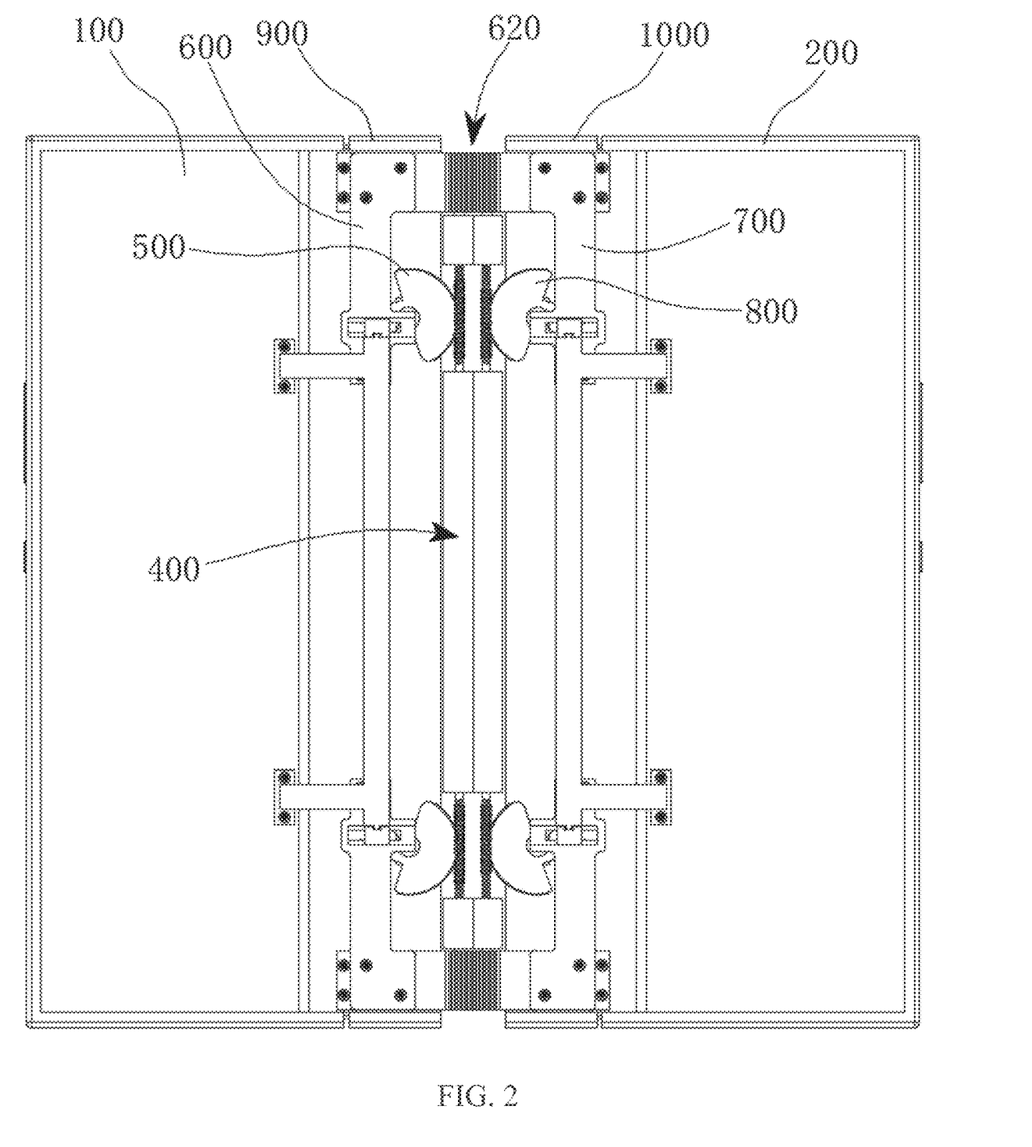
FIG. 2 is a schematic diagram of transmission of an electronic device according to an embodiment of the present disclosure.
Figure 3:
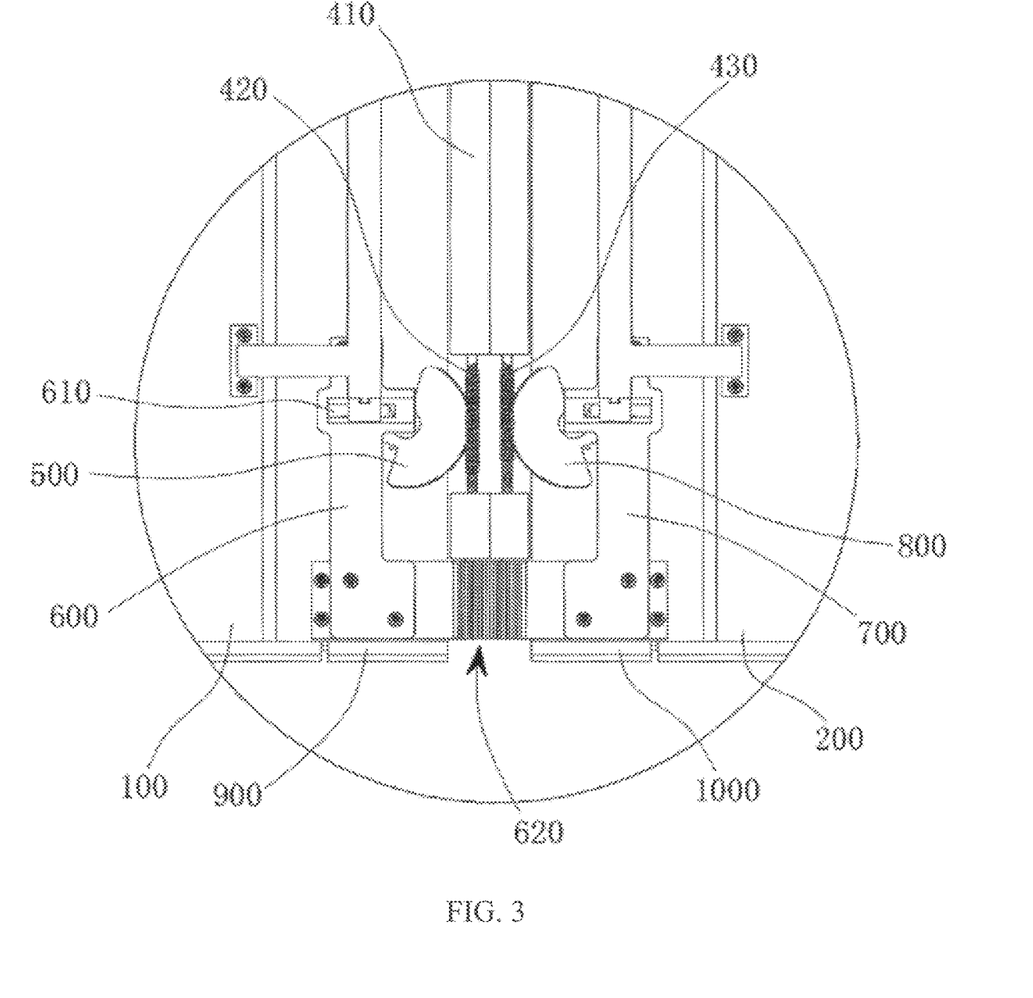
FIG. 3 is a partially enlarged schematic diagram of FIG. 2.
Figure 4:
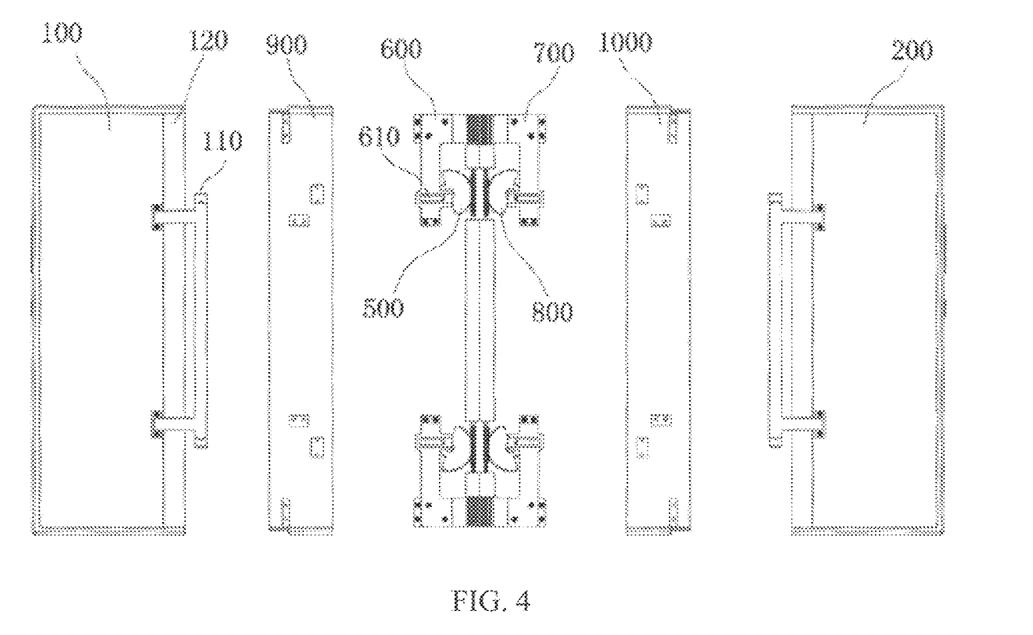
FIG. 4 is a schematic exploded view of an electronic device according to an embodiment of the present disclosure.

Refer to FIG. 2 to FIG. 4. The shaft assembly 400 includes a rotating shaft, an arc-shaped tooth section is disposed on the first transmission member 500, a thread section is disposed on the rotating shaft, and the thread section is engaged with the arc-shaped tooth section. The first transmission member 500 is connected to the first device body 100. For example, a first end of the first transmission member 500 is engaged with the thread section of the rotating shaft through the arc-shaped tooth section. A second end of the first transmission member 500 is connected to the flexible display screen 300. For example, a central angle corresponding to the arc-shaped tooth section may be adaptively adjusted based on displacement of movement of the first device body 100 relative to the shaft assembly 400 in a process of folding or unfolding the electronic device. For example, a circular tooth section or a semi-circular tooth section may be disposed at the first end of the first transmission member 500.

Figure 6:
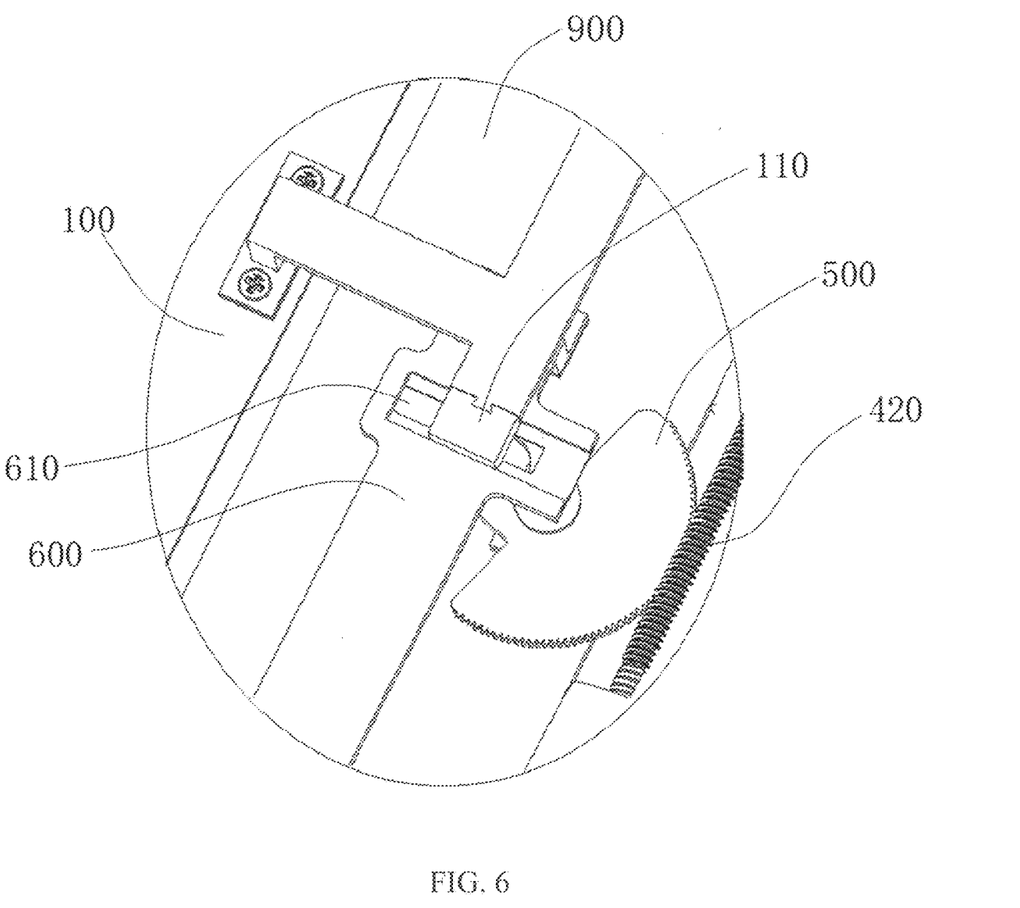
FIG. 6 is a schematic diagram of an assembly of components at a first transmission member from a first perspective according to an embodiment of the present disclosure.
Figure 8:
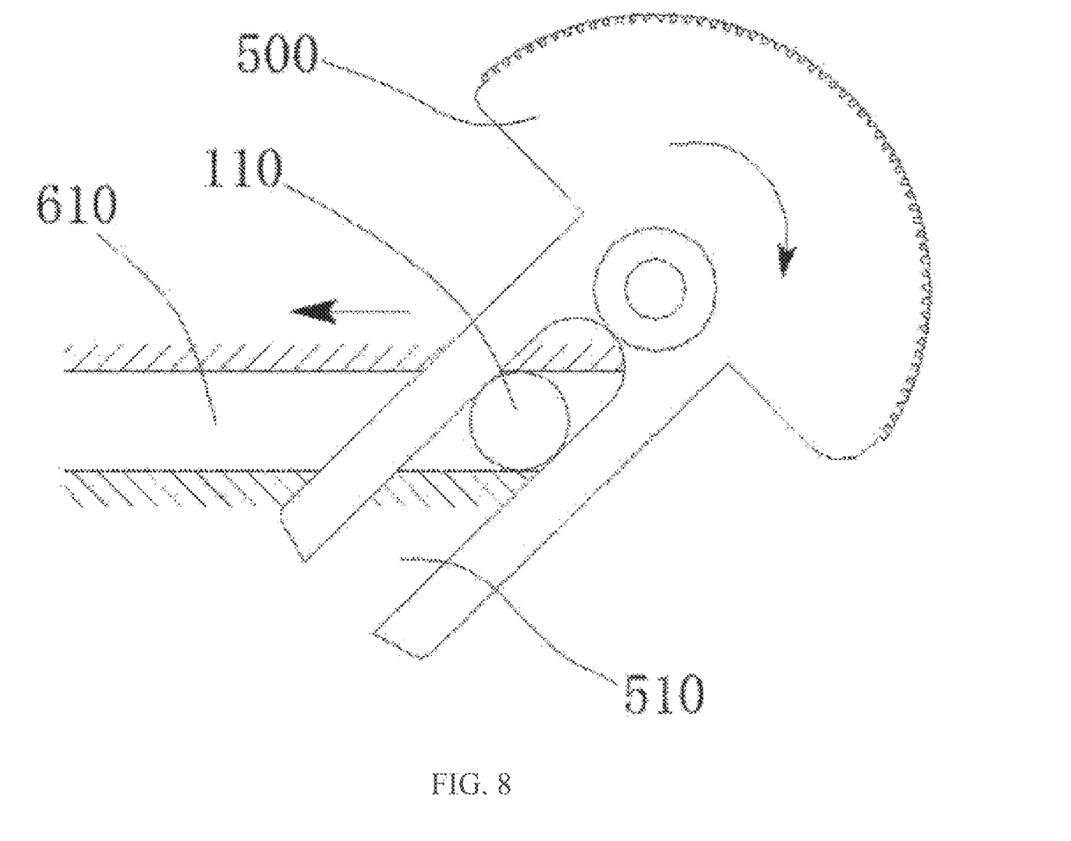
FIG. 8 is a schematic diagram of transmission between a first transmission member and a first sliding block according to an embodiment of the present disclosure.

Refer to FIG. 3, FIG. 6, and FIG. 8. In a process in which the first device body 100 rotates relative to the shaft assembly 400, the first transmission member 500 rotates relative to the rotating shaft, so that the thread section of the rotating shaft can drive the first transmission member 500 to rotate relative to the first mounting bracket 600, so as to drive the first display screen 310 to move along the first device body 100 in a direction toward or away from the shaft assembly 400.

In the foregoing embodiment, the first mounting bracket 600 can provide a mounting base for the first transmission member 500. Further, an axis of rotation of the first mounting bracket 600 relative to the shaft assembly 400 overlaps an axis of the rotating shaft corresponding to the first transmission member 500, so that in a process of folding or unfolding the electronic device, a distance between a center of rotation of the first transmission member 500 relative to the first mounting bracket 600 and the rotating shaft corresponding to the first transmission member 500 is unchanged. For example, the first mounting bracket 600 is rotatably matched with the rotating shaft corresponding to the first transmission member 500. It should be noted that, the rotating shaft corresponding to the first transmission member 500 described in this embodiment is a rotating shaft that is engaged with the arc-shaped tooth section of the first transmission member 500.

According to the foregoing embodiments, the flexible display screen 300 can be prevented from being stretched or squeezed in a process of folding the electronic device, so as to protect the flexible display screen 300. In addition, in a process of using the electronic device, the flexible display screen 300 may be subjected to force in various directions, for example, friction force generated in a process in which a finger slides on a surface of the flexible display screen 300. In the foregoing embodiment, transmission between the rotating shaft and the first transmission member 500 is implemented through engagement of the arc-shaped tooth section with the thread section, and a position of the first device body 100 can further be limited. In this way, the flexible display screen 300 is prevented from driving the first device body 100 to slide in a use process. Therefore, there is no need to add a damping structure that prevents the first device body 100 from sliding relative to the shaft assembly 400 to the electronic device described in the foregoing embodiment.

Figure 5:
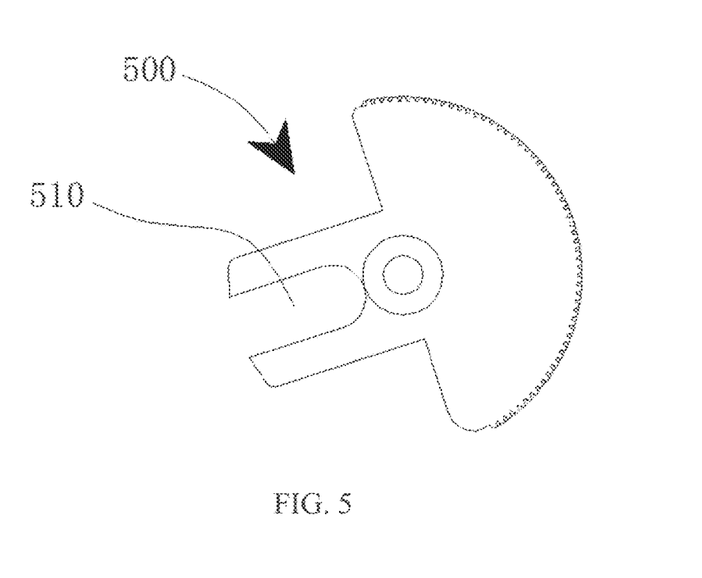
FIG. 5 is a schematic diagram of a first transmission member according to an embodiment of the present disclosure.

Refer to FIG. 3, FIG. 5, and FIG. 8. A first sliding groove 510 is provided on the first transmission member 500, and a guiding direction of the first sliding groove 510 intersects a moving direction of the first device body 100. A first sliding block 110 is disposed on the first device body 100, and the first sliding block 110 is slidably matched with the first sliding groove 510. For example, the guiding direction of the first sliding groove 510 is a direction in which the first sliding block 110 slides in the first sliding groove 510.

Refer to FIG. 8. In a process in which the first transmission member 500 rotates relative to the first mounting bracket 600, a side wall of the first sliding groove 510 drives the first sliding block 110 to slide along the first sliding groove 510. It should be noted that, the first device body 100 is slidably matched with the first mounting bracket 600, and the first device body 100 moves relative to the first mounting bracket 600 in a direction toward or away from the shaft assembly 400. Therefore, the first transmission member 500 may drive, through the first sliding block 110, the first device body 100 to move along the first mounting bracket 600 in a direction toward or away from the shaft assembly 400. Further, because the first display screen 310 is disposed on the first device body 100, the first transmission member 500 may drive, through the first device body 100, the first display screen 310 to move in a direction toward or away from the shaft assembly 400.

In an embodiment, an angle between the guiding direction of the first sliding groove 510 and the moving direction of the first device body 100 ranges from 45° to 90°, so that the first transmission member 500 drives the first device body 100 to move in a direction toward or away from the shaft assembly 400.

Figure 7:
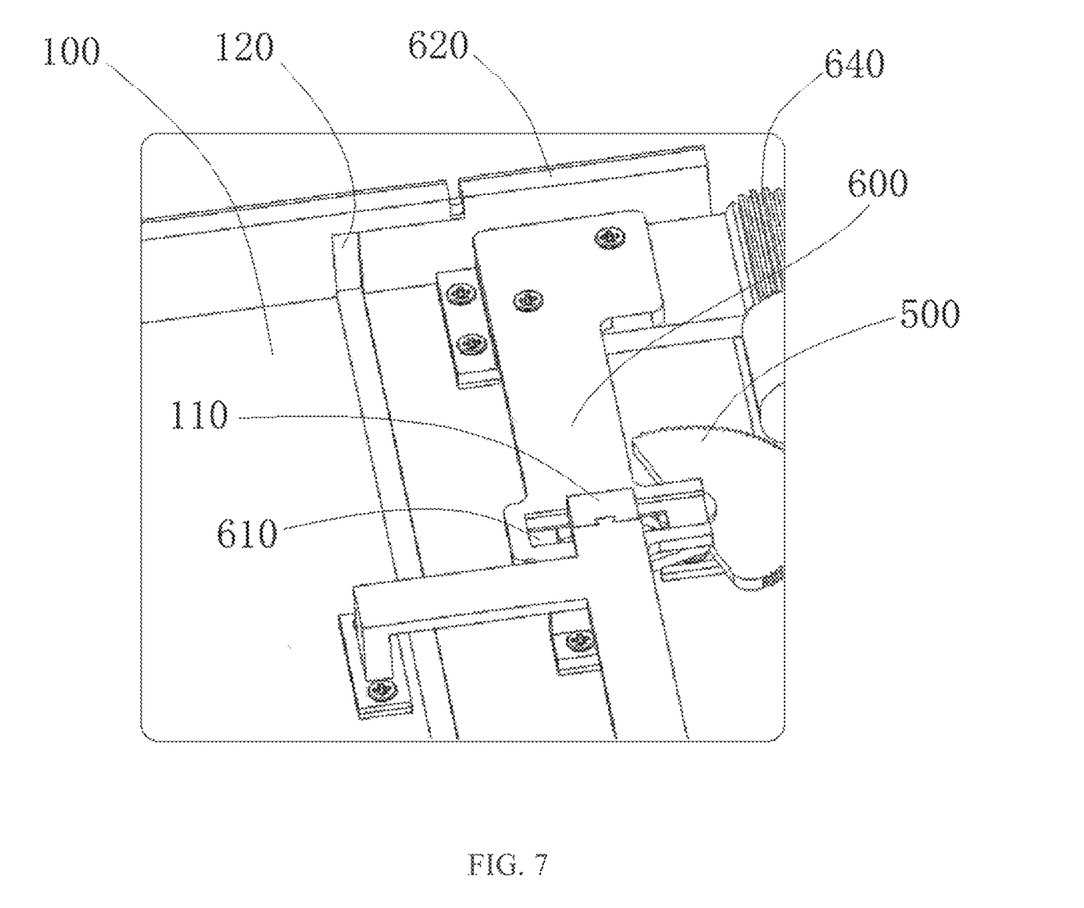
FIG. 7 is a schematic diagram of an assembly of components at a first transmission member from a second perspective according to an embodiment of the present disclosure.

Refer to FIG. 6 to FIG. 8. A second sliding groove 610 is provided on the first mounting bracket 600, and a guiding direction of the second sliding groove 610 is set along a direction in which the first device body 100 moves relative to the first mounting bracket 600. The first sliding block 110 is slidably matched with the second sliding groove 610. In this embodiment, the second sliding groove 610 can provide a guiding function for the first device body 100 to move relative to the first mounting bracket 600.

Refer to FIG. 8. In a process in which the first transmission member 500 rotates relative to the first mounting bracket 600, inner side walls of the first sliding groove 510 separately act on the first sliding block 110. Because the guiding direction of the first sliding groove 510 intersects the moving direction of the first device body 100, force applied by the first transmission member 500 to the first sliding block 110 has component force in the moving direction of the first device body 100, so as to drive the first sliding block 110 to slide along the first sliding groove 510. Therefore, under action of the shaft assembly 400, the first transmission member 500 in the foregoing embodiment may drive the first device body 100 and the first display screen 310 disposed on the first device body 100 to move in a direction toward or away from the shaft assembly 400.

Refer to FIG. 3 to FIG. 6. The electronic device further includes a second mounting bracket 700 and a second transmission member 800. The second mounting bracket 700 is rotatably connected to the shaft assembly 400, and the second device body 200 is slidably matched with the second mounting bracket 700. The second transmission member 800 is rotatably matched with the second mounting bracket 700, and the second transmission member 800 is connected to the shaft assembly 400 and the second device body 200. In a process of folding the electronic device, the shaft assembly 400 drives the second transmission member 800 to rotate relative to the second mounting bracket 700, and drives, through the second transmission member 800, the second device body 200 to move close to the shaft assembly 400. In a process of unfolding the electronic device, the shaft assembly 400 drives the second transmission member 800 to rotate relative to the second mounting bracket 700, and drives, through the second transmission member 800, the second device body 200 to move away from the shaft assembly 400.

In the foregoing embodiment, in a process of folding or unfolding the electronic device, the second device body 200 may drive the second display screen 320 to move along the second mounting bracket 700 in a direction toward or away from the shaft assembly 400, so as to protect the flexible display screen 300 in the process of folding or unfolding the electronic device. Further, in a process of folding or unfolding the electronic device, both the first device body 100 and the second device body 200 rotate relative to the shaft assembly 400, so that the first transmission member 500 can drive the first device body 100 to move in a direction toward or away from the shaft assembly 400, and the second transmission member 800 can drive the second device body 200 to move in a direction toward or away from the shaft assembly 400.

It should be noted that, a manner of connecting the second transmission member 800 to the second mounting bracket 700 may be the same as a manner of connecting the first transmission member 500 to the first mounting bracket 600. Therefore, this specification does not describe a manner of connecting the second transmission member 800 to the second mounting bracket 700. A manner of connecting the second transmission member 800 to the second device body 200 may be the same as a manner of connecting the first transmission member 500 to the first device body 100. Therefore, this specification does not describe the manner of connecting the second transmission member 800 to the second device body 200.

Refer to FIG. 3 to FIG. 6, the shaft assembly 400 includes a first rotating shaft 420 and a second rotating shaft 430. The first rotating shaft 420 and the second rotating shaft 430 are disposed in parallel, and both the first rotating shaft 420 and the second rotating shaft 430 are provided with a thread section. Both the first transmission member 500 and the second transmission member 800 are provided with an arc-shaped tooth section. The arc-shaped tooth section of the first transmission member 500 is engaged with the thread section of the first rotating shaft 420. The arc-shaped tooth section of the second transmission member 800 is engaged with the thread section of the second rotating shaft 430.

For example, the first mounting bracket 600 is rotatably connected to the first rotating shaft 420. In a process of folding or unfolding the electronic device, the first device body 100 drives the first mounting bracket 600 and the first transmission member 500 to rotate around the first rotating shaft 420. Further, the second mounting bracket 700 is rotatably connected to the second rotating shaft 430. In a process of folding or unfolding the electronic device, the second device body 200 drives the second mounting bracket 700 and the second transmission member 800 to rotate around the second rotating shaft 430.

Refer to FIG. 2 and FIG. 3. In a process of folding or unfolding the electronic device, the thread section of the first rotating shaft 420 interacts with the arc-shaped tooth section of the first transmission member 500, so that the first transmission member 500 can rotate relative to the first mounting bracket 600, to drive the first device body 100 to move in a direction toward or away from the shaft assembly 400. Similarly, the thread section of the second rotating shaft 430 may interact with the arc-shaped tooth section of the second transmission member 800, so that the second transmission member 800 can rotate relative to the second mounting bracket 700, to drive the second device body 200 to move in a direction toward or away from the shaft assembly 400.

In the foregoing embodiment, the first rotating shaft 420 and the second rotating shaft 430 are disposed in parallel, that is, the first device body 100 and the second device body 200 rotate around two parallel axes respectively, so that space for mutual avoidance between the first device body 100 and the second device body 200 is increased, to avoid mutual interference between the first device body 100 and the second device body 200 in a process of folding or unfolding the electronic device. Further, spacing between the first rotating shaft 420 and the second rotating shaft 430 may be adjusted based on a thickness of the first device body 100 and a thickness of the second device body 200. In some embodiments, larger spacing between the first rotating shaft 420 and the second rotating shaft 430 indicates larger space for mutual avoidance between the first device body 100 and the second device body 200 formed at the shaft assembly 400. Then, the spacing between the first rotating shaft 420 and the second rotating shaft 430 needs to be determined based on the thickness of the first device body 100 and the thickness of the second device body 200. Therefore, the spacing between the first rotating shaft 420 and the second rotating shaft 430 is not limited in this embodiment.

Refer to FIG. 2 and FIG. 3. The shaft assembly 400 further includes a bracket 410, and the first rotating shaft 420 is connected to the second rotating shaft 430 through the bracket 410. In this embodiment, the bracket 410 can provide a mounting base for the first rotating shaft 420 and the second rotating shaft 430, and the bracket 410 is configured to limit the spacing between the first rotating shaft 420 and the second rotating shaft 430. For example, the first rotating shaft 420 and the second rotating shaft 430 are separately connected to the bracket 410 in a rotation limiting manner, to prevent the first rotating shaft 420 and the second rotating shaft 430 from rotating relative to the bracket 410.

There are many manners to limit rotation of the first rotating shaft 420 relative to the bracket 410. For example, one of the first rotating shaft 420 and the bracket 410 is provided with a limiting protrusion, the other one of the first rotating shaft 420 and the bracket 410 is provided with a limiting slot, and the limiting protrusion is at least partially received in the limiting slot, to limit rotation of the first rotating shaft 420 relative to the bracket 410. In some alternative embodiments, both the first rotating shaft 420 and the bracket 410 are provided with a keyway, so that positions of the first rotating shaft 420 and the bracket 410 can be limited by a key. The first rotating shaft 420 may be designed as a limiting section, and the limiting section may be a hexagonal prism, a quadrilateral prism, or the like. A prismatic hole that matches the limiting section is provided on the bracket 410. The positions of the first rotating shaft 420 and the bracket 410 may be limited through fixed connection, for example, welding. Therefore, a specific manner of limiting rotation of the first rotating shaft 420 relative to the bracket 410 is not limited in this embodiment.

A manner of connecting the second rotating shaft 430 to the bracket 410 may be the same as a manner of connecting the first rotating shaft 420 to the bracket 410. Therefore, the manner of connecting the second rotating shaft 430 to the bracket 410 is not further described in this embodiment.

In an embodiment, an arc-shaped support surface is disposed on a side of the bracket 410 close to the flexible display screen 300, so that the bracket 410 can be configured to support the flexible display screen 300. For example, in a case that the electronic device is in a folded state, the third display screen 330 may be supported by the bracket 410. In addition, the arc-shaped support surface is disposed on the side of the bracket 410 close to the flexible display screen 300, so that deformation of the third display screen 330 can be effectively guided, to avoid excessive bending of a part of the third display screen 330. Further, the side of the bracket 410 close to the flexible display screen 300 is designed as a circular-arc support surface. In a case that the electronic device is in the folded state, curvature corresponding to parts of the flexible display screen 300 that are supported by the circular-arc support surface is consistent.

Refer to FIG. 5 and FIG. 7. The shaft assembly 400 further includes a supporting plate, and the supporting plate is disposed on a side of the bracket 410 close to the flexible display screen 300. An arc-shaped support surface is disposed on a side of the supporting plate close to the flexible display screen 300. For example, the supporting plate may provide support force for the flexible display screen 300 at a junction between the first device body 100 and the second device body 200, to avoid a force-induced depression of the flexible display screen 300 at the junction between the first device body 100 and the second device body 200. For example, the arc-shaped support surface is disposed on the side of the supporting plate close to the flexible display screen 300, and at least a part of the flexible display screen 300 is supported by the arc-shaped support surface, so that the flexible display screen 300 can be attached to the supporting plate better in a case that the electronic device is folded. The supporting plate may be fastened to the bracket 410. In some embodiments, the supporting plate may be fastened to the bracket 410 by using a screw. The supporting plate and the bracket 410 may be of an integrated structure.

In the foregoing embodiment, in a case that the electronic device is in the folded state, the supporting plate may be used to provide support for the third display screen 330, to avoid a force-induced depression of the third display screen 330. In a case that the electronic device is in an unfolded state, at least a part of the supporting plate may provide support for the third display screen 330.

Refer to FIG. 2 to FIG. 4. Both the first mounting bracket 600 and the second mounting bracket 700 are provided with a gear 620. For example, the first mounting bracket 600 is rotatably connected to the first rotating shaft 420 through the gear 620, and the second mounting bracket 700 is rotatably connected to the second rotating shaft 430 through the gear 620. Further, the gear 620 on the first mounting bracket 600 is engaged with the gear 620 on the second mounting bracket 700. In this embodiment, the first mounting bracket 600 and the second mounting bracket 700 are engaged with each other through the gears 620, so that the first mounting bracket 600 and the second mounting bracket 700 rotate relative to the shaft assembly 400 synchronously, effectively avoiding friction between the third display screen 330 and the shaft assembly 400, thereby protecting the third display screen 330.

Refer to FIG. 3 and FIG. 4. The electronic device further includes a third device body 900 and a fourth device body 1000. The third device body 900 is disposed on the first mounting bracket 600, the fourth device body 1000 is disposed on the second mounting bracket 700, and at least a part of the third display screen 330 is supported by the third device body 900 and the fourth device body 1000. For example, both the third device body 900 and the fourth device body 1000 have containing space. Further, the first mounting bracket 600 is at least partially received in the containing space of the third device body 900, and the first mounting bracket 600 is fixedly connected to the third device body 900. At least a part of the second mounting bracket 700 is disposed in the fourth device body 1000, and the second mounting bracket 700 is fixedly connected to the fourth device body 1000.

In the foregoing embodiment, the third device body 900 is connected to the shaft assembly 400 through the first mounting bracket 600, so that the third device body 900 can rotate relative to the shaft assembly 400 with the first mounting bracket 600. Similarly, the fourth device body 1000 is connected to the shaft assembly 400 through the second mounting bracket 700, so that the fourth device body 1000 can rotate relative to the shaft assembly 400 with the second mounting bracket 700. In a process of folding or unfolding the electronic device, the third device body 900 and the fourth device body 1000 may provide support for the third display screen 330.

In an embodiment, the first device body 100 may be slidably matched with the first mounting bracket 600 directly or indirectly. For example, one of the first device body 100 and the third device body 900 is provided with a third sliding groove 120, and the other one of the first device body 100 and the third device body 900 is at least partially received in the third sliding groove 120 and is slidably matched with the third sliding groove 120. In some alternative embodiments, a sliding groove is provided on the first device body 100, and at least a part of the first mounting bracket 600 is located in the sliding groove of the first device body 100, so that the first mounting bracket 600 can slide along the sliding groove of the first device body 100.

Similarly, the second device body 200 may be slidably matched with the second mounting bracket 700 directly or indirectly. For example, one of the second device body 200 and the fourth device body 1000 is provided with a fourth sliding groove, and the other one of the second device body 200 and the fourth device body 1000 is at least partially received in the fourth sliding groove and is slidably matched with the fourth sliding groove. In some alternative embodiments, a sliding groove is provided on the second device body 200, and the second mounting bracket 700 is at least partially received in the sliding groove of the second device body 200, so that the second mounting bracket 700 can slide along the sliding groove of the second device body 200.

In an embodiment, there are at least two first mounting brackets 600 and at least two second mounting brackets 700. For example, both the first mounting bracket 600 and the second mounting bracket 700 are disposed in an axial direction of the shaft assembly 400. It should be noted that, the axial direction of the shaft assembly 400 is an axial direction corresponding to a rotating shaft in the shaft assembly 400.

The electronic device disclosed in embodiments of this application may be a mobile phone, a watch, a vehicle-mounted display, a tablet computer, an e-book reader, a medical instrument, or the like. A specific type of the electronic device is not limited in embodiments of this application.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element defined by "includes a . . . " does not preclude the existence of other identical elements in the process, method, article, or apparatus that includes the element. In addition, it should be noted that, the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and various steps may be added, omitted, or combined. In addition, features described with reference to some examples may be combined in other examples.

Embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. An electronic device, comprising a first device body; a second device body; a flexible display screen; a shaft assembly; a first transmission member; and a first mounting bracket, wherein:
   the first mounting bracket is rotatably connected to the shaft assembly, the first device body is slidably matched with the first mounting bracket, and the second device body is connected to the shaft assembly,
   the flexible display screen comprises a first display screen, a second display screen, and a third display screen, wherein the first display screen is disposed on the first device body, the second display screen is disposed on the second device body, and the first display screen is connected to the second display screen through the third display screen,
   the first transmission member is rotatably matched with the first mounting bracket, and the first transmission member is connected to the shaft assembly and the first device body, respectively,
   in a process of folding the electronic device, the shaft assembly drives the first transmission member to rotate relative to the first mounting bracket, and drives, through the first transmission member, the first device body to move close to the shaft assembly, and
   in a process of unfolding the electronic device, the shaft assembly drives the first transmission member to rotate relative to the first mounting bracket, and drives, through the first transmission member, the first device body to move away from the shaft assembly.

2. The electronic device according to claim 1, wherein:
   the shaft assembly comprises a rotating shaft,
   an arc-shaped tooth section is disposed on the first transmission member,
   a thread section is disposed on the rotating shaft, and
   the thread section is engaged with the arc-shaped tooth section.

3. The electronic device according to claim 2, wherein:
   a first sliding groove is provided on the first transmission member,
   a guiding direction of the first sliding groove intersects a moving direction of the first device body,
   a first sliding block is disposed on the first device body, and
   the first sliding block is slidably matched with the first sliding groove.

4. The electronic device according to claim 3, wherein:
   a second sliding groove is provided on the first mounting bracket,
   a guiding direction of the second sliding groove is set along a direction in which the first device body moves relative to the first mounting bracket, and
   the first sliding block is slidably matched with the second sliding groove.

5. The electronic device according to claim 1, wherein:
   the electronic device further comprises a second mounting bracket and a second transmission member, the second mounting bracket is rotatably connected to the shaft assembly, and the second device body is slidably matched with the second mounting bracket,
   the second transmission member is rotatably matched with the second mounting bracket, and the second transmission member is connected to the shaft assembly and the second device body,
   in a process of folding the electronic device, the shaft assembly drives the second transmission member to rotate relative to the second mounting bracket, and drives, through the second transmission member, the second device body to move close to the shaft assembly; and
   in a process of unfolding the electronic device, the shaft assembly drives the second transmission member to rotate relative to the second mounting bracket, and drives, through the second transmission member, the second device body to move away from the shaft assembly.

6. The electronic device according to claim 5, wherein:
   the shaft assembly comprises a first rotating shaft and a second rotating shaft, the first rotating shaft and the second rotating shaft are disposed in parallel, both the first rotating shaft and the second rotating shaft are provided with a thread section, and both the first transmission member and the second transmission member are provided with an arc-shaped tooth section,
   the arc-shaped tooth section of the first transmission member is engaged with the thread section of the first rotating shaft, and
   the arc-shaped tooth section of the second transmission member is engaged with the thread section of the second rotating shaft.

7. The electronic device according to claim 6, wherein the shaft assembly further comprises a bracket, and the first rotating shaft is connected to the second rotating shaft through the bracket.

8. The electronic device according to claim 7, wherein the shaft assembly further comprises a supporting plate, and the supporting plate is disposed on a side of the bracket close to the flexible display screen.

9. The electronic device according to claim 6, wherein both the first mounting bracket and the second mounting bracket are provided with a gear, and the gear on the first mounting bracket is engaged with the gear on the second mounting bracket.

10. The electronic device according to claim 5, wherein:
    the electronic device further comprises a third device body and a fourth device body,
    the third device body is disposed on the first mounting bracket,
    the fourth device body is disposed on the second mounting bracket, and
    at least a part of the third display screen is supported by the third device body and the fourth device body.

11. The electronic device according to claim 10, wherein:
    one of the first device body and the third device body is provided with a third sliding groove, and the other one of the first device body and the third device body is at least partially received in the third sliding groove and is slidably matched with the third sliding groove, and
    one of the second device body and the fourth device body is provided with a fourth sliding groove, and the other one of the second device body and the fourth device body is at least partially received in the fourth sliding groove and is slidably matched with the fourth sliding groove.

* * * * *